United States Patent
Kim et al.

(10) Patent No.: US 7,661,448 B2
(45) Date of Patent: Feb. 16, 2010

(54) AUTOMATIC LIQUID DISPENSER AND REFRIGERATOR WITH THE SAME

(75) Inventors: Jong Hwan Kim, Seoul (KR); Ju Hwan Yun, Seoul (KR); Young Hyun Lee, Seoul (KR); Dong Joo You, Seoul (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 11/924,411

(22) Filed: Oct. 25, 2007

(65) Prior Publication Data

US 2008/0216504 A1  Sep. 11, 2008

(30) Foreign Application Priority Data

Mar. 5, 2007 (KR) .................. 10-2007-0021450
Mar. 26, 2007 (KR) .................. 10-2007-0029348

(51) Int. Cl.
 *B65B 1/30*  (2006.01)
(52) U.S. Cl. .................. 141/94; 141/83; 141/360; 340/618

(58) Field of Classification Search .................. 141/83, 141/94–96, 192, 198, 351, 360; 73/290 R; 250/227.11; 340/618–619
See application file for complete search history.

(56) References Cited

U.S. PATENT DOCUMENTS

| | | | |
|---|---|---|---|
| 5,587,089 A * | 12/1996 | Vogel et al. | 210/764 |
| 6,789,585 B1 * | 9/2004 | Janke | 141/198 |
| 7,201,005 B2 * | 4/2007 | Voglewede et al. | 62/126 |
| 2008/0083475 A1 * | 4/2008 | Lamb | 141/198 |

* cited by examiner

*Primary Examiner*—Timothy L Maust
*Assistant Examiner*—Jason K Niesz
(74) *Attorney, Agent, or Firm*—Birch, Stewart, Kolasch & Birch, LLP

(57) ABSTRACT

An automatic liquid dispenser and a refrigerator with the same is disclosed wherein a level of liquid to be ejected into a receptacle can be established, and a display module is mounted to thereby enhance a user convenience, and wherein the automatic liquid dispenser is mounted on the refrigerator to allow being independently driven and manufactured.

20 Claims, 8 Drawing Sheets

AUTOMATIC LIQUID DISPENSER AND REFRIGERATOR WITH THE SAME

CROSS-REFERENCE TO RELATED APPLICATION

The present application is based on, and claims priorities from, Korean Application Numbers 10-2007-0021450 filed Mar. 5, 2007 and 10-2007-0029348 filed Mar. 26, 2007, disclosures of which are incorporated by reference herein in its entirety.

BACKGROUND

The disclosed technique relates to an automatic liquid dispenser and a refrigerator with the same. In general, liquid dispensers are installed on refrigerators and water purifiers to allow a user to readily extract liquid stored therein. Particularly, liquid dispensers mounted on refrigerators are so designed as to allow a user to extract liquid therethrough from outside without recourse to opening of a door of the refrigerators.

FIG. 1 is a perspective view illustrating a state where a liquid dispenser is mounted on a refrigerator according to prior art. A door 110 of a refrigerator 100 is frontally mounted with a liquid dispenser 120.

The liquid dispenser 120 is disposed with a receptacle accommodator 130, and a liquid ejecting key (not shown) for ejecting the liquid is installed inside the liquid dispenser 120. When a user inserts a receptacle 140 into the receptacle accommodator 130 of the liquid dispenser 120 mounted on the front surface of a door 110 of the refrigerator 100, and presses the liquid ejecting key, the liquid may be ejected into the receptacle 140 only during a time the liquid ejecting key is depressed.

If a liquid dispenser is mounted on a refrigerator, there is no need of opening a door of the refrigerator, such that coolness inside the refrigerator may not be leaked outside to thereby reduce power consumption of the refrigerator, and to further lengthen or maintain the freshness of foods stored inside the refrigerator.

Development of automatically dispensed liquid dispensers has been recently attempted, largely with a view to providing a user convenience.

SUMMARY

A first object is to provide an automatic liquid dispenser and a refrigerator with the same wherein a user can set up a level of liquid to be ejected into a receptacle, and when the receptacle is inserted into the automatic liquid dispenser and the user presses an automatic operation button, the liquid can be ejected into the receptacle up to the established level, the level of which can be visually detected by the user to thereby enhance a user convenience.

A second object is to provide an automatic liquid dispenser and a refrigerator with the same wherein a receptacle arranger capable of precisely arranging a receptacle underneath a nozzle is disposed on a receptacle accommodator so that liquid ejected from the nozzle may be inputted only into the receptacle placed on the receptacle accommodator to thereby prevent the automatic liquid dispenser from being splashed.

A third object is to provide an automatic liquid dispenser and a refrigerator with the same wherein the automatic liquid dispenser is independently attached to a main body of the refrigerator to allow the automatic liquid dispenser to be functionally and structurally free from a main board unit of the refrigerator, such that the refrigerator may be used even if the automatic liquid dispenser is out of order or under maintenance or repair.

A fourth object is to provide an automatic liquid dispenser and a refrigerator with the same wherein ejection of liquid into a receptacle is independently functioned from a main board of the refrigerator to uproot destruction, damage and other dangerous elements of the main board of the refrigerator that may be caused by malfunction of liquid supply in the automatic liquid dispenser.

A fifth object is to provide an automatic liquid dispenser and a refrigerator with the same whereby a main body of the refrigerator and the automatic liquid dispenser can be independently manufactured and assembled.

A sixth object is to provide an automatic liquid dispenser and a refrigerator with the same wherein each constituent part of the automatic liquid dispenser is separately configured such that replacement, maintenance and repair can be easily performed.

In one general aspect, an automatic liquid dispenser and a refrigerator with the same includes a liquid dispensing module measuring a liquid height, dispensing liquid into a receptacle and measuring a level of the liquid ejected into the receptacle, a display module indicating the level inside the receptacle, and a controller controlling operation of the liquid dispensing module and the display module.

In another general aspect, an automatic liquid dispenser and a refrigerator with the same includes a main body of the refrigerator including a main board unit for driving the refrigerator, a liquid dispensing module disposed in the main body of the refrigerator for measuring a receptacle height, dispensing liquid into a receptacle and measuring a level of the liquid dispensed into the receptacle, a display module indicating an operation state of the refrigerator, and a controller controlling the operation of the display module.

DETAILED DESCRIPTION

The features and nature of this description will become more apparent from the detailed description set forth below when taken in conjunction with the drawings.

Figure 1:
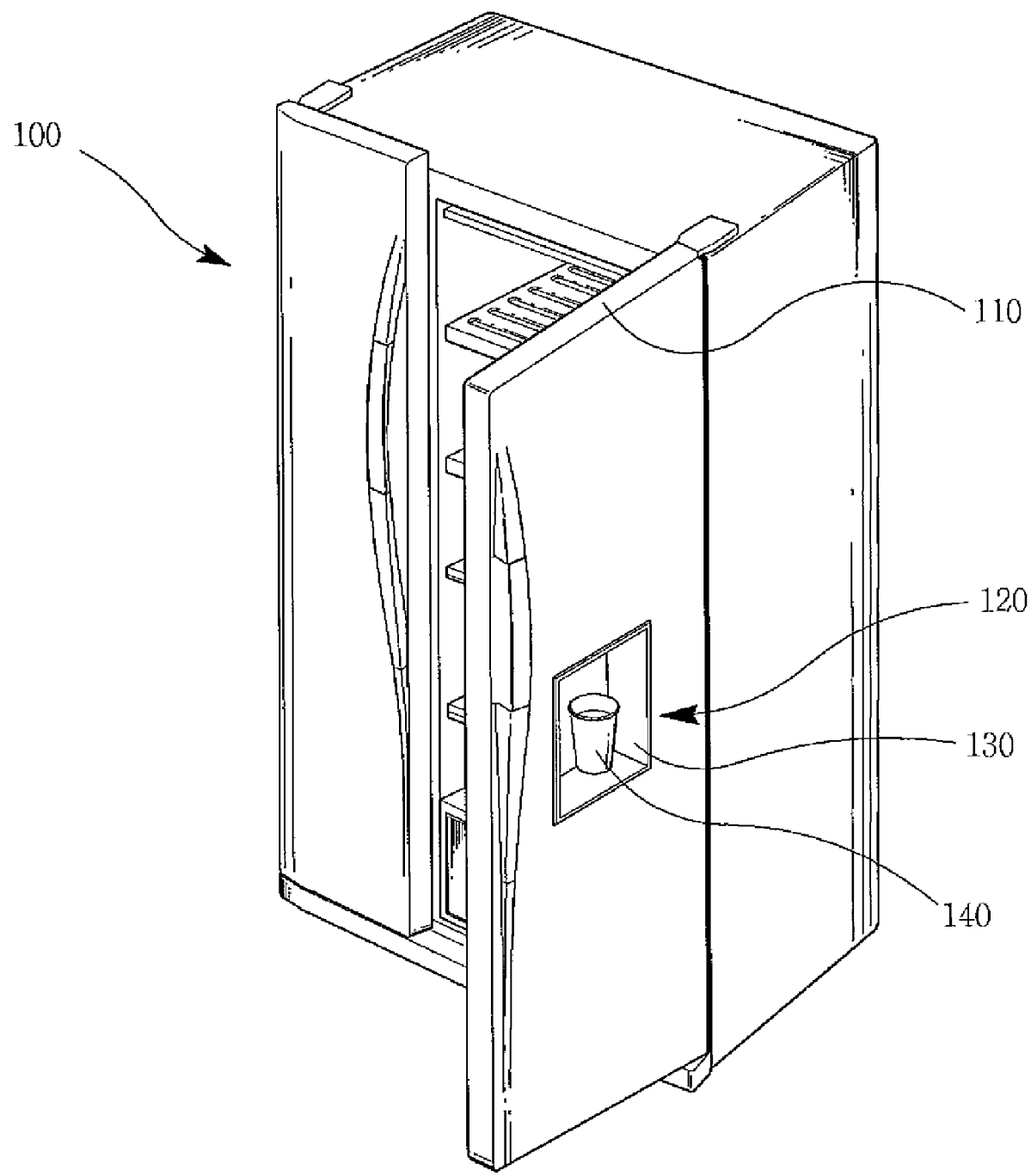
FIG. 1 is a perspective view illustrating an automatic liquid dispenser mounted on a refrigerator according to prior art.
Figure 2:
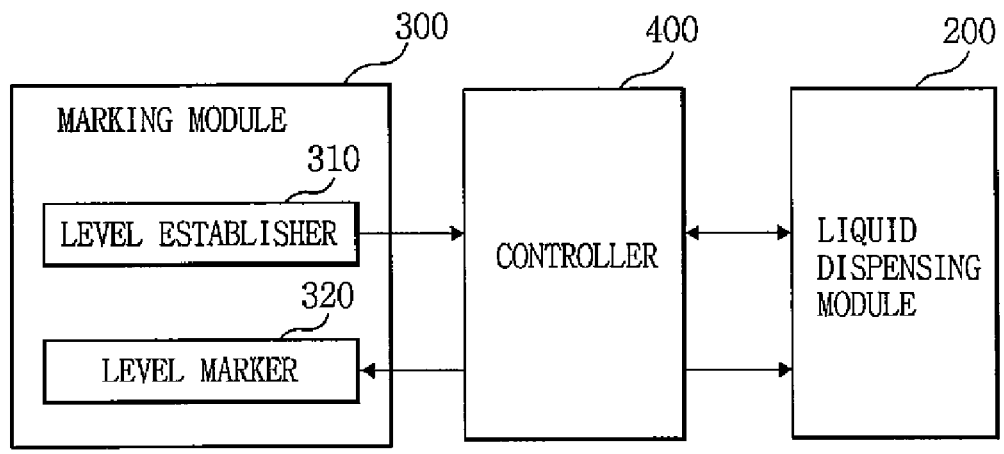
FIG. 2 is a schematic block diagram illustrating an automatic liquid dispenser.

FIG. 2 is a schematic block diagram illustrating an automatic liquid dispenser according to the present inventive disclosure.

Referring to FIG. 2, the automatic liquid dispenser includes a liquid dispensing module 200 measuring a liquid height, dispensing liquid into a receptacle and measuring a level of the liquid ejected into the receptacle, a display module 300 establishing a level of liquid dispensed by the liquid dispensing module 200 and marking the level inside the receptacle, and a controller 400 controlling operation of the liquid dispensing module and the display module.

The display module 300 includes a level establisher 310 so provided as to set up a level of liquid dispensed by the liquid dispensing module 200, and a level indicator 320 indicating the level of liquid inside the receptacle.

Preferably, the level indicator 320 further includes an alarm generating an alarm sound at a point when liquid ejection into the receptacle is completed. Preferably, the level indicator 320 indicates the established level of liquid. Preferably, the level indicator 320 indicates the liquid level by way of variable pictures, colors, bars or numbers. Preferably, the level indicator 320 indicates a level of liquid contained in the receptacle in advance.

Meanwhile, it is preferable that the automatic liquid dispenser further include a detecting unit detecting whether the receptacle has been accommodated. Preferably, the display module 300 further includes a liquid ejection stopper by which a user may forcibly stop the ejection of liquid. Preferably, the automatic liquid dispenser further includes an additional process requester by which a user may additionally eject the liquid.

Figure 3:
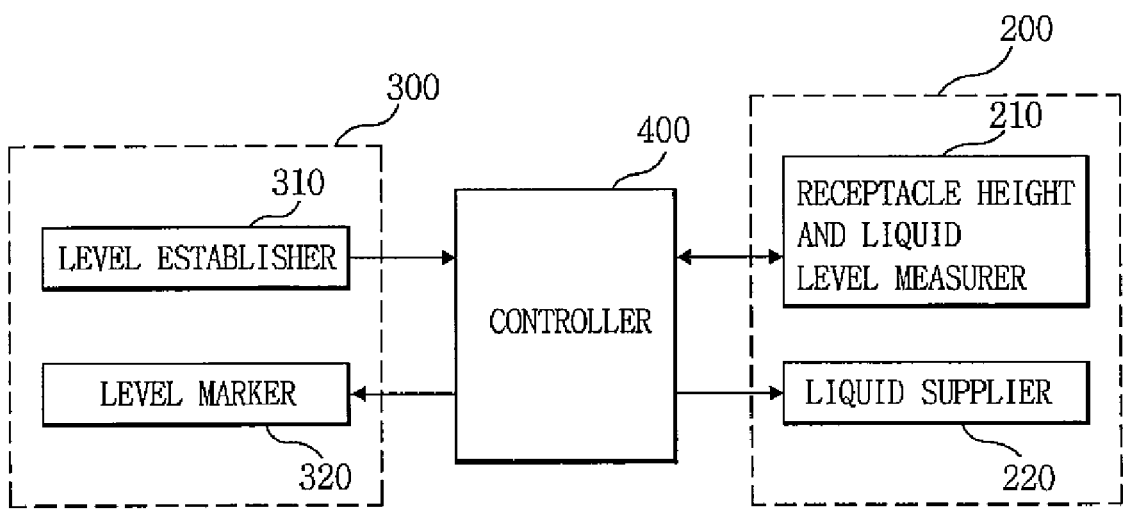
FIG. 3 is a schematic block diagram illustrating a detailed configuration of an automatic liquid dispenser.

FIG. 3 is a schematic block diagram illustrating a detailed configuration of an automatic liquid dispenser, wherein the liquid dispensing module 200 of the automatic liquid dispenser includes a receptacle height and liquid level measurer 210 measuring a receptacle height and a level of liquid inside the receptacle, and a liquid supplier 220 supplying liquid into the receptacle.

The controller 400 receives a signal of a level of the liquid set up by the level establisher 310 to control the level of the liquid inside the receptacle, and outputs the signal relative to the liquid level inside the receptacle to the level indicator 320, and controls the receptacle height and liquid level measurer 210 and the liquid supplier 220.

Therefore, a user may set up a level of liquid inside the receptacle using the level establisher 310 of the display module 300, and signal relative to the established liquid level may be inputted into the controller 330.

The controller 330 drives the liquid supplier 220 at the liquid dispensing module 200 to cause the liquid to be ejected into the receptacle, and to cause the receptacle height and liquid level measurer 210 to measure the receptacle height, and controls in such a manner that the level of liquid ejected into the receptacle can be measured. The controller 330 receives the receptacle height measured by the receptacle height and liquid level measurer 210 and the signal relative to the liquid level and outputs a signal indicating the liquid level to the level indicator 320 of the display module 300.

Furthermore, the level set up by the level establisher 310 is a saturated quantity of liquid ejected into the receptacle. For example, if liquid is inputted into a receptacle having a height of 'a', the level of liquid inputted into the receptacle is established at a predetermined percentage, such as, i.e., at 100%.

As noted above, the automatic liquid dispenser has an advantage in that a user can set up a level of liquid to be ejected into a receptacle, and when the receptacle is inserted into the automatic liquid dispenser and the user presses an automatic operation button, the liquid can be ejected into the receptacle up to the established level, the level of which can be visually detected by the user to thereby enhance a user convenience.

Figure 4:
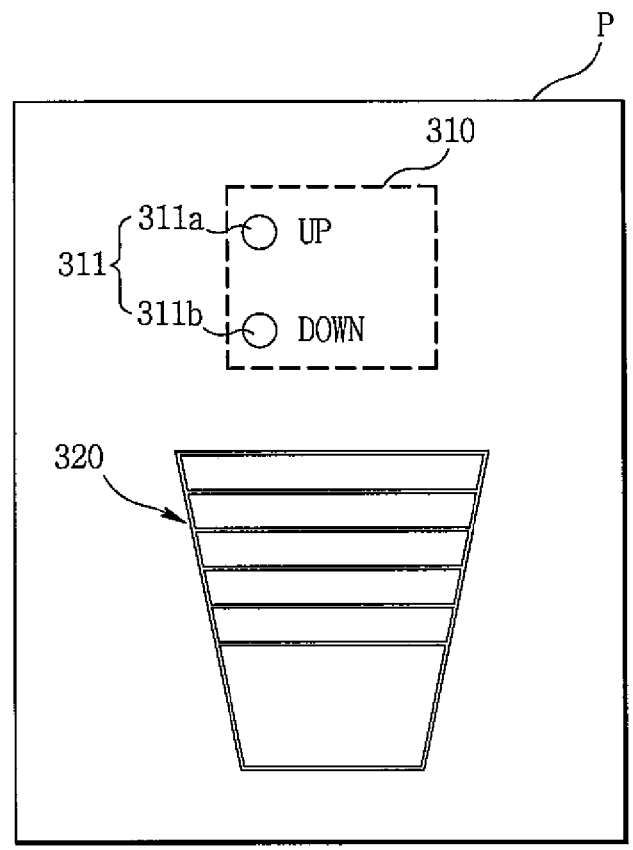
FIG. 4 is a schematic rendering of a display module according to an exemplary implementation.

FIG. 4 is a schematic rendering of a display module according to an exemplary implementation.

Referring to FIG. 4, the display module is installed on a panel (P) so that a user can set up a liquid level or visually detect the indicated liquid level. The level establisher 310 of the display module is preferably a level raising and lowering key 311 so provided as to establish the level in the receptacle. The level raising and lowering key 311 is preferably comprised of a level raising key 311a and a level lowering key 311b.

At this time, the level raising and lowering key 311 is operated after a user accommodates a receptacle into the automatic liquid dispenser. In other words, if the receptacle is not available in the automatic liquid dispenser, the level raising and lowering key 311 is not operated. Furthermore, the level raising and lowering key 311 is provided at a controller to allow a user to change a predetermined liquid level value. The level raising and lowering key 311 may be configured of a button type or a touch screen type.

Referring to FIG. 4 again, the level indicator 320 of the display module is preferably shaped of a cross-sectional receptacle, and is more preferably shaped of a cross-sectional receptacle divided into plural regions to show liquid levels inside the receptacle, where each divided region is equipped with an LED (Light Emitting Diode).

If the level indicator 320 has a cross-sectional shape of a receptacle divided into plural regions to display each level of liquid inside the receptacle, it is convenient for a user to detect the liquid levels with the naked eye.

Figure 5A:
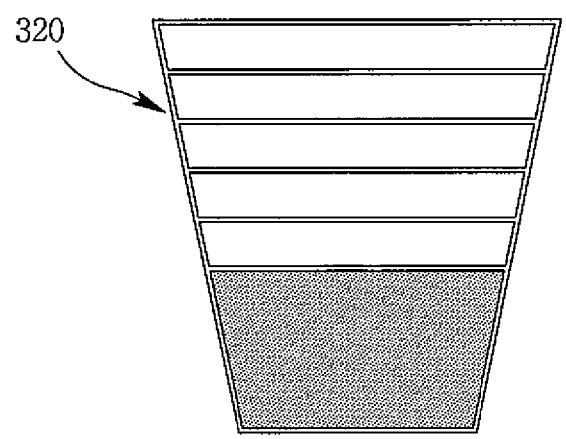
FIGS. 5a to 5c are schematic renderings of a level indicator on which a level of liquid ejected into a receptacle is marked.
Figure 5B:
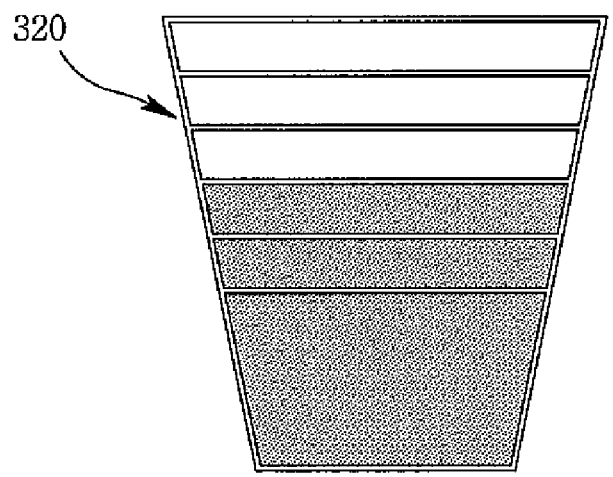
Figure 5C:
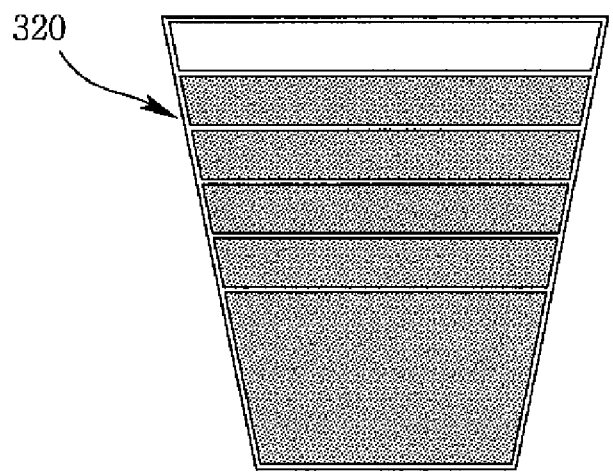

For example, as shown in FIGS. 5a, 5b and 5c, if liquid is inputted into the receptacle, the divided regions of the receptacle-shaped level indicator 320 are sequentially displayed to allow a user to visually and easily detect the liquid levels. It should be apparent that the divided regions can be lighted with the LEDs to show the liquid levels inside the receptacle.

Figure 6A:
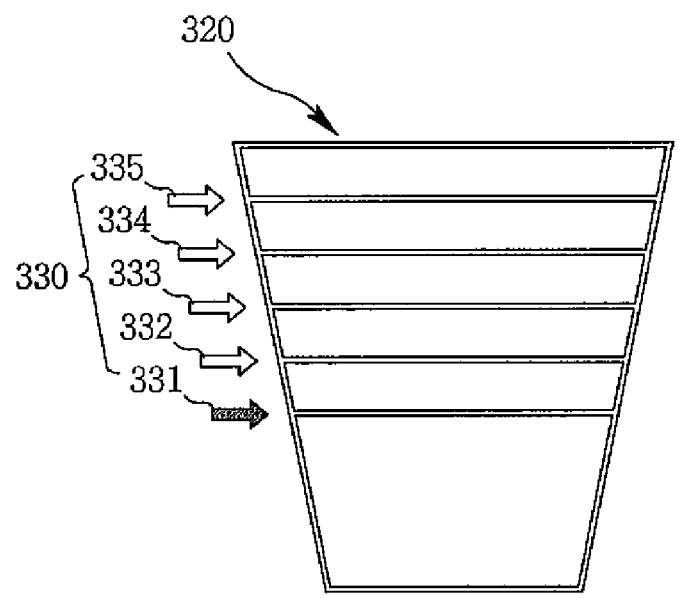
FIGS. 6a and 6b are schematic renderings of a level indicator on which a level of liquid is marked according to an established level set up by a level establisher.
Figure 6B:
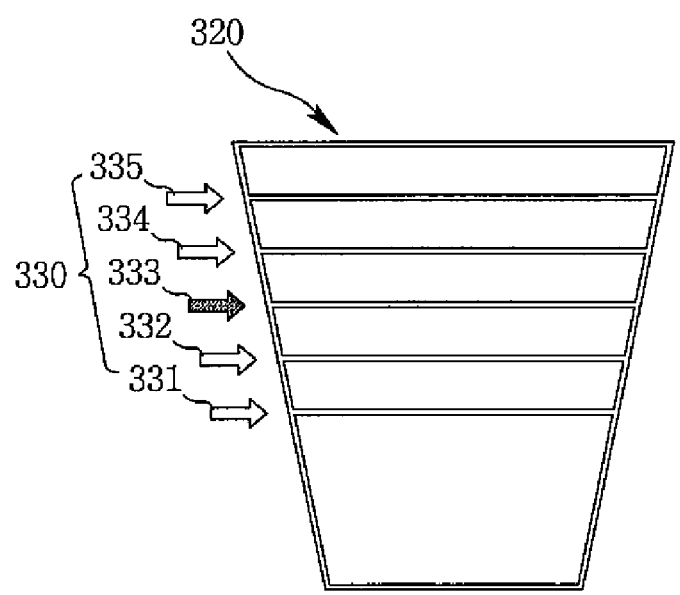

FIGS. 6a and 6b are schematic renderings of a level indicator on which a level of liquid is marked according to an established level set up by a level establisher.

As depicted in FIGS. 6a and 6b, it is preferable that the automatic liquid dispenser be further disposed with a level indicator 330 to show the liquid levels corresponding to levels established by a level establisher, in addition to the receptacle-shaped level indicator 320 divided into plural regions to display each level of the liquid inside the receptacle.

The level indicator 330 may display the levels inside the receptacle in response to pressed times of the level raising and lowering key 311, such that a user can set up a desired level by pressing the level raising and lowering key 311 while watching the level indicator 320, whereby an enhanced convenience to the user can be provided.

Referring again to FIG. 6a, if a user presses the level raising key once, '331' of the level indicator 330 is displayed at a lower section of the receptacle-shaped level indicator 320.

If the user presses the level raising key 311a three times, '333' of the level indicator 330 is displayed on a third divided region of the receptacle-shaped level indicator 320 as shown in FIG. 6b.

At this time, the level indicator 330 is formed with the LEDs, such that if the LEDs are lighted in response to the level established by the level establisher, the level indicator 330 can be displayed. Each divided region of the level indicator 320 may be divisively displayed with different color, different brightness or different chromaticity of the same color.

Furthermore, the level indicator 320 can display the levels each at a different step, and also divide the levels into a minimum level, an intermediate level and a maximum level, where, it is preferable to display each level in mutually distinguishable colors, that is, the minimum level being displayed in green colors, the intermediate level in yellow colors and the maximum level being displayed in red colors. Preferably, the level indicator 330 is shaped of an arrow or a number.

Figure 7:
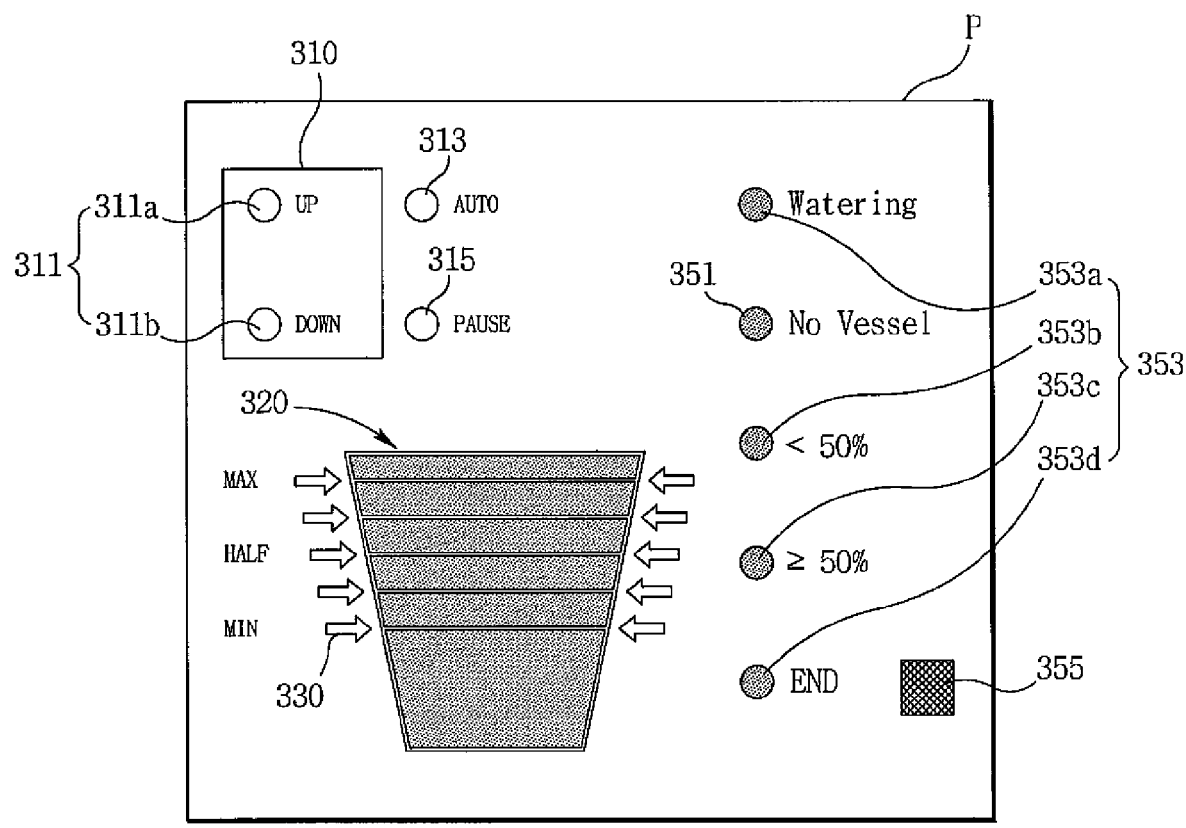
FIG. 7 is a schematic rendering of a display module according to another exemplary implementation.

FIG. 7 is a schematic rendering of a display module according to another exemplary implementation.

Referring to FIG. 7, the display module preferably includes at least one or more devices out of a receptacle absence/presence display unit 351 indicating whether there is present or absent a receptacle in the automatic liquid dispenser, a liquid ejection state display unit 353 indicating a state of ejection of liquid into the receptacle, an alarm generating an alarm sound if the ejection of liquid into the receptacle is completed, and a liquid ejection pause key 315 (PAUSE) by which a user can forcibly pause the ejection of liquid into the receptacle while the liquid is being ejected into the receptacle.

When the liquid ejection pause key 315 is operated, a controller controls a liquid path switch for opening or closing a liquid path connected from a liquid tank to a liquid supplier to close the liquid path, whereby the ejection of liquid can be stopped regardless of whether the liquid has reached an established level or not.

The display module is also provided with a liquid ejection automatic start key 313 (AUTO) for allowing a user to eject the liquid into the receptacle up to an established level. A controller 400 outputs a signal indicating whether there is a receptacle or not in response to the signal detected by the receptacle height and liquid level measurer 210 of FIG. 3, and the aforementioned receptacle absence/presence display unit 351 indicates whether there is a receptacle or not in response to the signal outputted by the controller 400 indicating whether there is a receptacle.

In other words, when a user accommodates the receptacle in the automatic liquid dispenser to manipulate the level establisher 310, the receptacle height and liquid level measurer 210 detects whether there is a receptacle according to the signal from the controller 400, and if the receptacle is available in the automatic liquid dispenser, the ejection of liquid is started, and if there is no receptacle in the dispenser or the receptacle is wrongly placed in the dispenser, the receptacle absence/presence display unit 351 is lighted to stop the ejection of the liquid.

The receptacle height and liquid level measurer 210 may be an ultrasonic emission and reception transducer but it is not limited thereto, and may be comprised of a detecting sensor of other type for detecting the receptacle height. If the receptacle absence/presence display unit 351 is lit, the user may re-check the presence, absence or position of the receptacle inside the automatic liquid dispenser.

Meanwhile, the liquid ejection state display unit 353 includes at least one or more devices out of a liquid ejection progress state key (Watering) 353a, a 50% less-liquid input state key 353b that is lit when the liquid is filled less than 50% of the receptacle before the liquid is ejected, a 50% more-liquid input state key 353c that is lit when the liquid is filled more than 50% of the receptacle before the liquid is ejected (≧0%), and a liquid ejection completion key 353d. The liquid input state key is not fixed at 50% of the receptacle as a reference value, but may be fixed at 70% or 80% of the receptacle. To with, the reference value may be discretionarily designed.

The liquid ejection progress state key (Watering) 353a may be turned on or off in order to indicate that the ejection of liquid is being continuously progressed. The liquid ejection progress state key (Watering) 353a is turned off if the liquid ejection pause key 315 is manipulated by the user or the ejection of the liquid is terminated.

The 50% less-liquid input state key 353b is lighted if it is determined by the receptacle height and liquid level measurer 210 that liquid has been already filled in less than 50% of the receptacle before the liquid is ejected by the liquid dispensing module.

If the liquid ejection into the receptacle is completed, the liquid ejection progress state key (Watering) 353a and the 50% less-liquid input state key 353b are turned off, and instead the liquid ejection completion key 353d is lighted. The liquid ejection completion key 353d is also turned off after a predetermined period of time lapses.

The 50% more-liquid input state key 353c is lighted if it is checked by the receptacle height and liquid level measurer 210 that liquid has been already filled in more than 50% of the receptacle before the liquid is ejected by the liquid dispensing module, and subsequent liquid ejection progresses are thoroughly stopped by a program in the controller.

The present technical disclosure is configured in such a fashion that 50% or more liquid is initially filled in the receptacle and liquid ejection more than 50% of the receptacle is not recommended and fundamentally prohibited.

The present technical disclosure is so configured as to further include an alarm 355 that generates an alarm sound to a user when the liquid supply is completed. The alarm 355 is preferred to generate an alarm for a predetermined period of time or a predetermined interval. The alarm 355 is preferred to be used for notifying a liquid ejection completion state to the user, but may be used for other purposes.

The controller controls the liquid ejection state display unit 353 and the alarm 355.

Now, an exemplary implementation of operation of the automatic liquid dispenser will be described.

First, a user accommodates a receptacle in a receptacle accommodator (not shown) of the automatic liquid dispenser.

If the liquid level is established by the level establisher, the level indicator is lighted in response thereto.

When the liquid level establishment is completed by the level establisher and the automatic start key is pressed by the user, the receptacle height is measured by the receptacle height and liquid level measurer.

When a signal relative to the receptacle height measured by the receptacle height and liquid level measurer is received by the controller, the controller determines that the signal has been received according to the program mounted thereon to determine the receptacle height and whether the receptacle has been normally accommodated.

As a result of the determination, if the receptacle has been normally accommodated, the controller controls the liquid path switch to open the liquid path.

When the liquid path is opened by the operation of the liquid path switch, liquid is inputted into the receptacle from the liquid supplier. At this time, the receptacle height and liquid level measurer detects the level of liquid inside the receptacle in real time to send a signal to the controller.

The controller processes the signal inputted from the receptacle height and liquid level measurer in real time to control the level indicator 320, whereby the level of inputted liquid is displayed in real time.

If the level of the inputted liquid corresponds to the level established by the user, the liquid ejection completion key 353d is turned on or off, and the alarm is driven concurrently to advise the user that the receptacle into which the liquid ejection has been completed be removed.

If the user desires to fill more liquid in the receptacle, the desired amount of liquid may be inputted into the receptacle by further manipulating the level raising key at the level establisher. However, the level established by the user cannot surpass the predetermined maximum liquid ejection level value relative to the receptacle.

Figure 8:
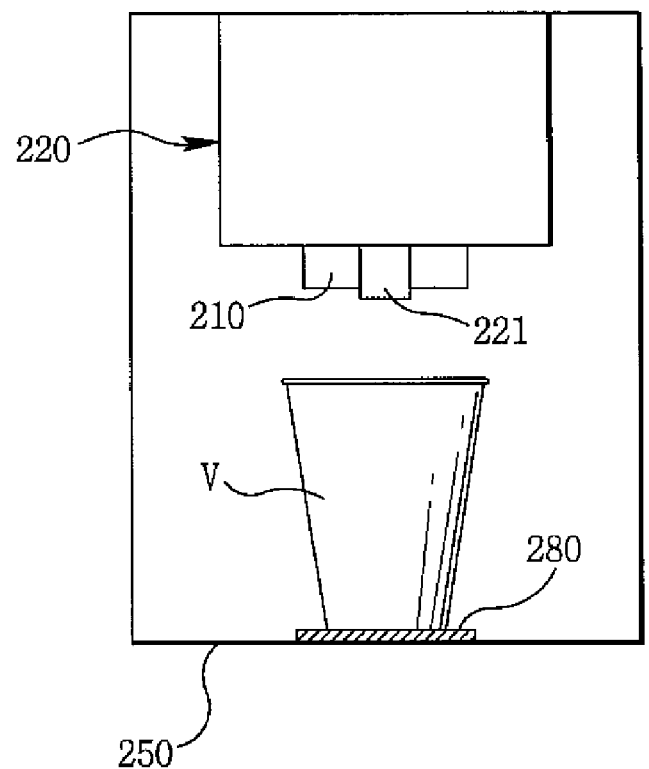
FIG. 8 is a schematic cross-sectional view illustrating a liquid dispensing module according to an exemplary implementation.

FIG. 8 is a schematic cross-sectional view illustrating a liquid dispensing module according to an exemplary implementation, where the liquid dispensing module 200 further includes a receptacle accommodator 250. The receptacle accommodator 250 is a flat horizontal space disposed inside the automatic liquid dispenser with its front being opened for the receptacle to be accommodated therein. The receptacle accommodator 250 is mounted at an inner upper surface thereof with the liquid supplier 220.

The liquid supplier 220 is connected to the liquid tank that contains liquid via a liquid path, and is comprised of at least one or more nozzles disposed above the receptacle accommodator 250, where the nozzle functions as a liquid exhaust port.

In other words, the liquid is supplied from the liquid tank to the liquid supplier via the liquid path, and the liquid is ejected into the receptacle (V) from the liquid supplier through the nozzle 221.

Referring to FIG. 8, the receptacle height and liquid level measurer 210 is disposed near the nozzle 221 of the receptacle accommodator 250, where the receptacle height and liquid level measurer 210 may be comprised of an ultrasonic emission transducer and at least one or more ultrasonic reception transducers. To wit, ultrasonic is emitted to the receptacle (V) accommodated at the receptacle accommodator 250, and the ultrasonic is detected that is reflected from an upper surface of the receptacle or an upper surface of liquid inside the receptacle to enable to measure the receptacle height and the liquid level inside the receptacle.

Meanwhile, it is preferred that the receptacle accommodator 250 be mounted with a receptacle arranger 280 for smoothly arranging the receptacle (V) therein. The receptacle arranger 280 is formed on a floor surface of the receptacle accommodator 250, as shown in FIG. 8.

In other words, if the receptacle arranger 280 is formed on a floor surface of the receptacle accommodator 250 of the liquid dispensing module, the receptacle can be placed on the receptacle accommodator 250 by a user, and the receptacle (V) can be precisely arranged underneath the nozzle 221 such that the liquid ejected from the nozzle 221 can be precisely inputted into the receptacle (V) arranged on the receptacle accommodator 250, thereby enabling to prevent the liquid from splashing onto the liquid dispensing module.

Figure 9:
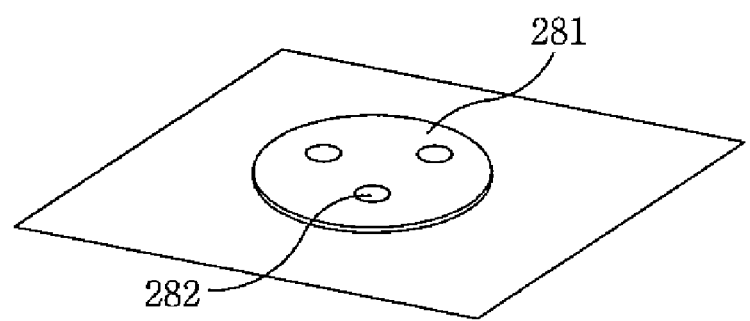
FIG. 9 is a schematic rendering illustrating a receptacle arranger according to an exemplary implementation.

FIG. 9 is a schematic rendering illustrating a receptacle arranger according to an exemplary implementation, where the receptacle arranger may be embodied by, i.e., an identifying mark 281.

In other words, the identifying mark 281 is designed for a user to easily accommodate the receptacle (V) on a precise position with the naked eye.

Preferably, the identifying mark 281 is made of a tape with a colored or hologram surface, or made of a colored material that can be distinguished from the floor surface of the receptacle accommodator 250. More preferably, the identifying mark 281 has an excellent reflectivity power relative to emission of ultrasonic from the receptacle and level detector 220.

The identifying mark 281, being formed in a circular shape on which the receptacle (V) is provided, is preferably made of waterproof material for easily removing the liquid because the identifying mark 281 is disposed inside the receptacle accommodator 250 which might leak the liquid.

Preferably, the identifying mark 281 is further disposed with at least one or more light sources 282, so that the user may easily accommodate the receptacle (V) inside the receptacle accommodator. In other words, the light source 282 may be turned on or off responsive to a control signal from a controller to allow the user to precisely arrange the receptacle in the receptacle arranger 281.

The light source 282 is preferably an LED (Light Emitting Diode) lamp. It should be understood however that a variety of other light sources may be employed as long as identification by a user can be made easy, and it is apparent that installation position of the light source is an elective matter which is not to be restricted at all.

Figure 10:
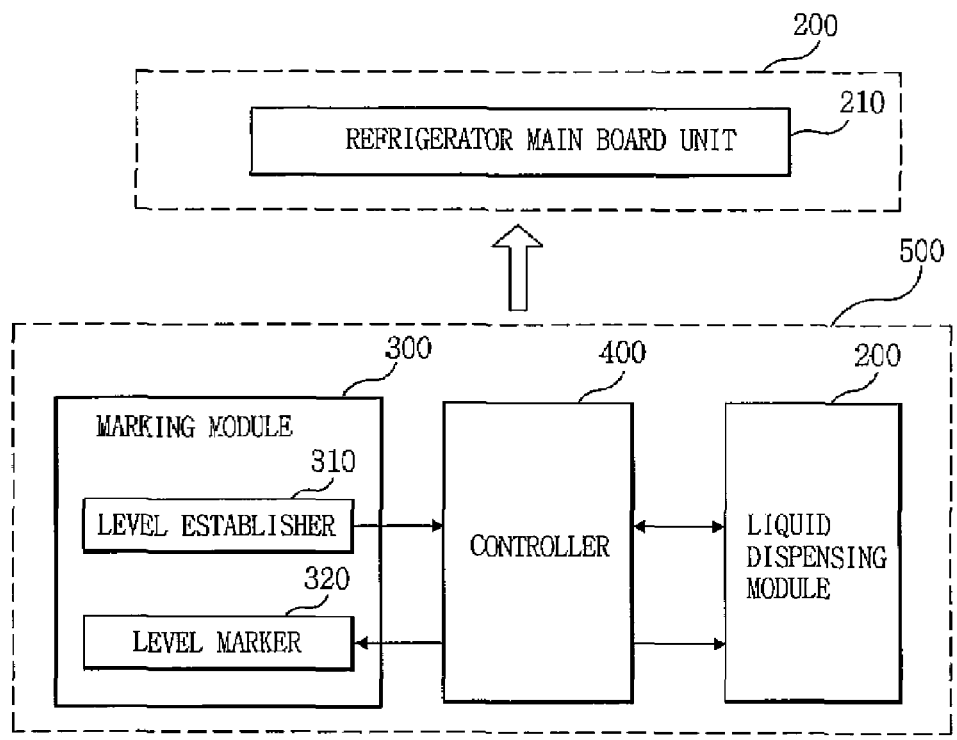
FIG. 10 is a schematic block diagram illustrating a structure of a refrigerator disposed with an automatic liquid dispenser.

FIG. 10 is a schematic block diagram illustrating a structure of a refrigerator disposed with an automatic liquid dispenser.

Referring to FIG. 10, a main body 200 of the refrigerator (hereinafter referred to as main body 200) is mounted with a main board unit 210 of the refrigerator (hereinafter referred to as main board unit 210) for driving the refrigerator, where the main board unit 210 is an essential part of the refrigerator that takes care of main functions such as refrigerating, freezing, circulating, and door lamp turning on/off functions, among others.

The main board unit 210 is a device for driving a refrigerator. The main body 200 is mounted at a door thereof with an automatic liquid dispenser as shown in FIG. 2, and the automatic liquid dispenser is disposed with a display module 300 and a liquid dispensing module 200, each being a respectively separated module unit.

Preferably, the display module 300 indicates an operational state of the liquid dispensing module 200. Preferably, the display module 200 is driven independently from the main board unit 210. Preferably, the power supplied to the liquid dispensing module 200 is inputted from the main body 200 via the display module 300.

Furthermore, the liquid dispensing module 200 includes an ultrasonic sensor for measuring the receptacle height or the liquid height. The liquid dispensing module 200 includes an ultrasonic emission/reception circuit unit for receiving the ultrasonic from the ultrasonic sensor and transmitting the ultrasonic. The display module 300 is preferred to include an ultrasonic circuit analyzing unit for analyzing a signal received from the ultrasonic emission/reception circuit unit.

Therefore, there is an advantage in the automatic liquid dispenser and a refrigerator with the same thus described in that the automatic liquid dispenser is independently attached to a main body of the refrigerator to allow the automatic liquid dispenser to be functionally and structurally free from a main board unit of the refrigerator, such that the refrigerator may be used even if the automatic liquid dispenser is out of order or under maintenance or repair.

There is another advantage in the automatic liquid dispenser and a refrigerator with the same thus described in that ejection of liquid into a receptacle is independently functioned from a main board of the refrigerator to fundamentally rule out destruction, damage and other dangerous elements of the main board of the refrigerator that may be caused by malfunction of liquid supply in the automatic liquid dispenser.

There is still another advantage in the automatic liquid dispenser and a refrigerator with the same thus described in that the main body and the automatic liquid dispenser can be independently manufactured, inspected and assembled.

There is still further advantage in the automatic liquid dispenser and a refrigerator with the same thus described in that each constituent part of the automatic liquid dispenser is separately configured such that replacement, maintenance and repair can be easily performed.

In other words, the refrigerator equipped with the automatic liquid dispenser includes a main body 200 of the refrigerator including a main board unit 210 for driving the refrigerator, a liquid dispensing module 200 disposed in the main body 200 of the refrigerator for measuring a receptacle height, dispensing liquid into a receptacle and measuring a level of the liquid dispensed into the receptacle, a display module 30 indicating an operation state of the refrigerator, and a controller 400 controlling the operation of the display module 300.

Figure 11:
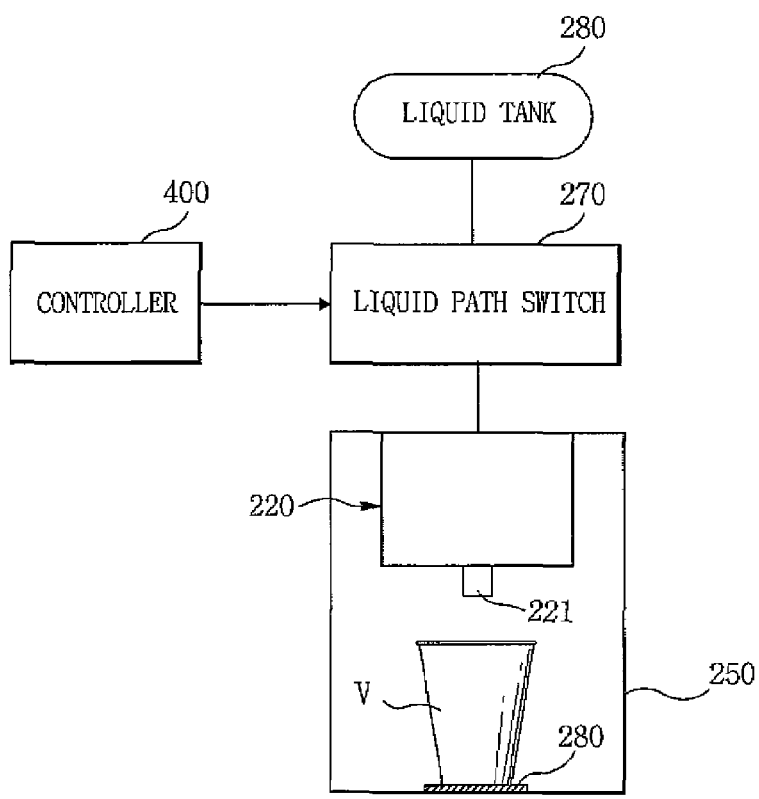
FIG. 11 is a schematic block diagram illustrating an ejection of liquid from an automatic liquid dispenser.

FIG. 11 is a schematic block diagram illustrating an ejection of liquid from an automatic liquid dispenser wherein the controller 400 controls the liquid path switch 270 to open the liquid path if the receptacle (V) is normally accommodated into the receptacle accommodator 250.

When the liquid path is opened by the liquid path switch 270, liquid is ejected into the receptacle (V) from the nozzle 221 of the liquid supplier 220. The controller 400 is driven independently from the main board unit disposed in the aforementioned main body of the refrigerator. The liquid path switch 270 is an actuator which is interposed between the liquid tank 280 and the liquid supplier for opening and closing the liquid path in response to an electrical signal. The liquid path switch 270 may be freely designed and changed in that the liquid path switch can receive the electricity from an independent electric source, or from the main board unit of the refrigerator.

It should be understood that the above-described implementations are not limited by any of the details of the foregoing description. Accordingly, other implementations are within the scope of the following claims, and all changes that fall within meets and bounds of the claims, or equivalence of such meets and bounds are therefore intended to be embraced by the claims.

As apparent from the foregoing, there is an advantageous effect in the automatic liquid dispenser and a refrigerator with the same thus described in that a user can set up a level of liquid to be ejected into a receptacle, and when the receptacle is inserted into the automatic liquid dispenser and the user presses an automatic operation button, the liquid can be ejected into the receptacle up to the established level, the level of which can be visually detected by the user to thereby enhance a user convenience.

There is another advantageous effect in that a receptacle arranger capable of precisely arranging a receptacle underneath a nozzle is disposed on a receptacle accommodator so that liquid ejected from the nozzle may be inputted only into the receptacle placed on the receptacle accommodator to thereby prevent the automatic liquid dispenser from being splashed.

There is another advantageous effect in that the automatic liquid dispenser is independently mounted to a main body of the refrigerator to allow the automatic liquid dispenser to be functionally and structurally free from a main board unit of the refrigerator, such that the refrigerator may be used even if the automatic liquid dispenser is out of order or under maintenance or repair.

There is another advantageous effect in that ejection of liquid into a receptacle is independently functioned from a main board of the refrigerator to uproot destruction, damage and other dangerous elements of the main board of the refrigerator that may be caused by malfunction of liquid supply in the automatic liquid dispenser.

There is still another advantageous effect in that a main body of the refrigerator and the automatic liquid dispenser can be independently manufactured and assembled.

There is still further advantageous effect in that each constituent part of the automatic liquid dispenser is separately configured such that replacement, maintenance and repair can be easily performed.

What is claimed is:

1. An automatic liquid dispenser comprising:
a liquid dispensing module measuring a liquid height, dispensing liquid into a receptacle and measuring a level of the liquid ejected into the receptacle;
a display module indicating the level of the liquid inside the receptacle; and
a controller controlling an operation of the liquid dispensing module and the display module,
wherein the display module comprises:
a level establisher provided for establishing the level of the liquid dispensed by the liquid dispensing module; and
a level indicator for indicating the level of the liquid inside the receptacle,
wherein the level indicator has a cross-sectional shape of the receptacle, and is divided therein by a plurality of regions for indicating the level of the liquid inside the receptacle.

2. The automatic liquid dispenser as claimed in claim 1, wherein the liquid dispensing module comprises:
a receptacle height and liquid level measurer for measuring a receptacle height and the level of the liquid inside the receptacle; and
a liquid supplier for supplying the liquid into the receptacle.

3. The automatic liquid dispenser as claimed in claim 1, wherein the level establisher is a level raising and lowering key provided for establishing the level of the liquid inside the receptacle.

4. The automatic liquid dispenser as claimed in claim 1, wherein the level indicator indicates the established level of the liquid.

5. The automatic liquid dispenser as claimed in claim 1, wherein the level indicator displays the level of the liquid by using variable pictures, colors, bars or numbers.

6. The automatic liquid dispenser as claimed in claim 1, wherein the display module further comprises a level indicator for indicating the divided regions of the receptacle-shaped level indicator corresponding to the levels established by the level establisher.

7. The automatic liquid dispenser as claimed in claim 1, further comprising: a detector for detecting whether the receptacle has been accommodated.

8. The automatic liquid dispenser as claimed in claim 7, wherein the display module further comprises a receptacle state display unit indicating whether or not the receptacle is present and whether or not the receptacle has been accommodated.

9. The automatic liquid dispenser as claimed in claim 1, further comprising:
an alarm generating an alarm sound at a point where the ejection of the liquid into the receptacle has been completed.

10. The automatic liquid dispenser as claimed in claim 1, further comprising:
a liquid ejection pause unit for forcibly stopping the ejection of the liquid by a user.

11. The automatic liquid dispenser as claimed in claim 1, further comprising:
an additional progress requesting unit for additionally performing the ejection of the liquid by the user.

12. The automatic liquid dispenser as claimed in claim 1, wherein the level indicator displays the levels of liquid inputted beforehand inside the receptacle.

13. The automatic liquid dispenser as claimed in claim 1, wherein the liquid dispensing module further comprises a receptacle accommodator for accommodating the receptacle, wherein an identifying mark is further installed on the receptacle accommodator for arranging the receptacle.

14. The automatic liquid dispenser as claimed in claim 13, wherein the identifying mark is made of water-proof material.

15. The automatic liquid dispenser as claimed in claim 13, further comprising:
at least one or more light sources on the identifying mark.

16. The automatic liquid dispenser as claimed in claim 1, wherein the liquid dispensing module is disposed on a main body of a refrigerator including a main board unit for driving the refrigerator, and the display mode further indicates
an operation state of the refrigerator.

17. The automatic liquid dispenser as claimed in claim 16, wherein the liquid dispensing module is driven independently from a main board unit.

18. The automatic liquid dispenser as claimed in claim 16, wherein the liquid dispensing module includes an ultrasonic sensor.

19. The automatic liquid dispenser as claimed in claim 16, wherein the liquid dispensing module includes an ultrasonic emission/reception circuit unit.

20. The automatic liquid dispenser as claimed in claim 19, wherein the display module comprises an ultrasonic circuit analyzing unit for analyzing a signal output from the ultrasonic emission/reception circuit unit.

* * * * *